US012754695B2

(12) United States Patent
Wu et al.

(10) Patent No.: US 12,754,695 B2
(45) Date of Patent: Oct. 6, 2026

(54) MULTI-PLANE PRE-READ FOR SEQUENTIAL READ PERFORMANCE

(71) Applicant: Micron Technology, Inc., Boise, ID (US)

(72) Inventors: Wenjun Wu, Shanghai (CN); Feng Xu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/059,104

(22) Filed: Feb. 20, 2025

(65) Prior Publication Data

US 2025/0284433 A1 Sep. 11, 2025

Related U.S. Application Data

(60) Provisional application No. 63/561,656, filed on Mar. 5, 2024.

(51) Int. Cl.
*G06F 3/06* (2006.01)

(52) U.S. Cl.
CPC .......... *G06F 3/0659* (2013.01); *G06F 3/0611* (2013.01); *G06F 3/0656* (2013.01); *G06F 3/0679* (2013.01)

(58) Field of Classification Search
CPC .... G06F 3/0659; G06F 3/0611; G06F 3/0656; G06F 3/0679; G06F 3/061; G06F 3/0638; G06F 3/0658
See application file for complete search history.

(56) References Cited

U.S. PATENT DOCUMENTS

2022/0229722 A1* 7/2022 Karkra .................. G06F 3/0689
2022/0350744 A1* 11/2022 Urrinkala ............ G06F 12/0246
2023/0107227 A1* 4/2023 Tan ....................... G06F 3/0613 711/154
2026/0086740 A1* 3/2026 Huo ...................... G06F 3/0659

* cited by examiner

*Primary Examiner* — Sean D Rossiter
(74) *Attorney, Agent, or Firm* — Holland & Hart LLP

(57) ABSTRACT

Methods, systems, and devices for supporting improved sequential read performance using plane pre-read are described. A memory system may include a buffer configured to store data read from planes of a memory device. A host system may issue a read command for first data stored sequentially at a set of memory devices, and a controller may perform multi-plane read operations in response to the read command. For a last multi-plane read operation, data read from a first subset of planes from the memory device may be output to the host device, while data read from a second subset of planes from the memory device may be stored at the buffer. The host device may issue another read command for second data, and the controller may output the data stored at the buffer in response to the read command, without performing another read operation on the memory device.

20 Claims, 7 Drawing Sheets

MULTI-PLANE PRE-READ FOR SEQUENTIAL READ PERFORMANCE

CROSS REFERENCE

The present Application for Patent claims priority to U.S. Patent Application No. 63/561,656 by Wu et al., entitled "MULTI-PLANE PRE-READ FOR SEQUENTIAL READ PERFORMANCE," filed Mar. 5, 2024, which is assigned to the assignee hereof, and which is expressly incorporated by reference in its entirety herein.

TECHNICAL FIELD

The following relates to one or more systems for memory, including plane pre-read to improve sequential read performance for memory devices, including not-and (NAND) devices.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and NAND memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
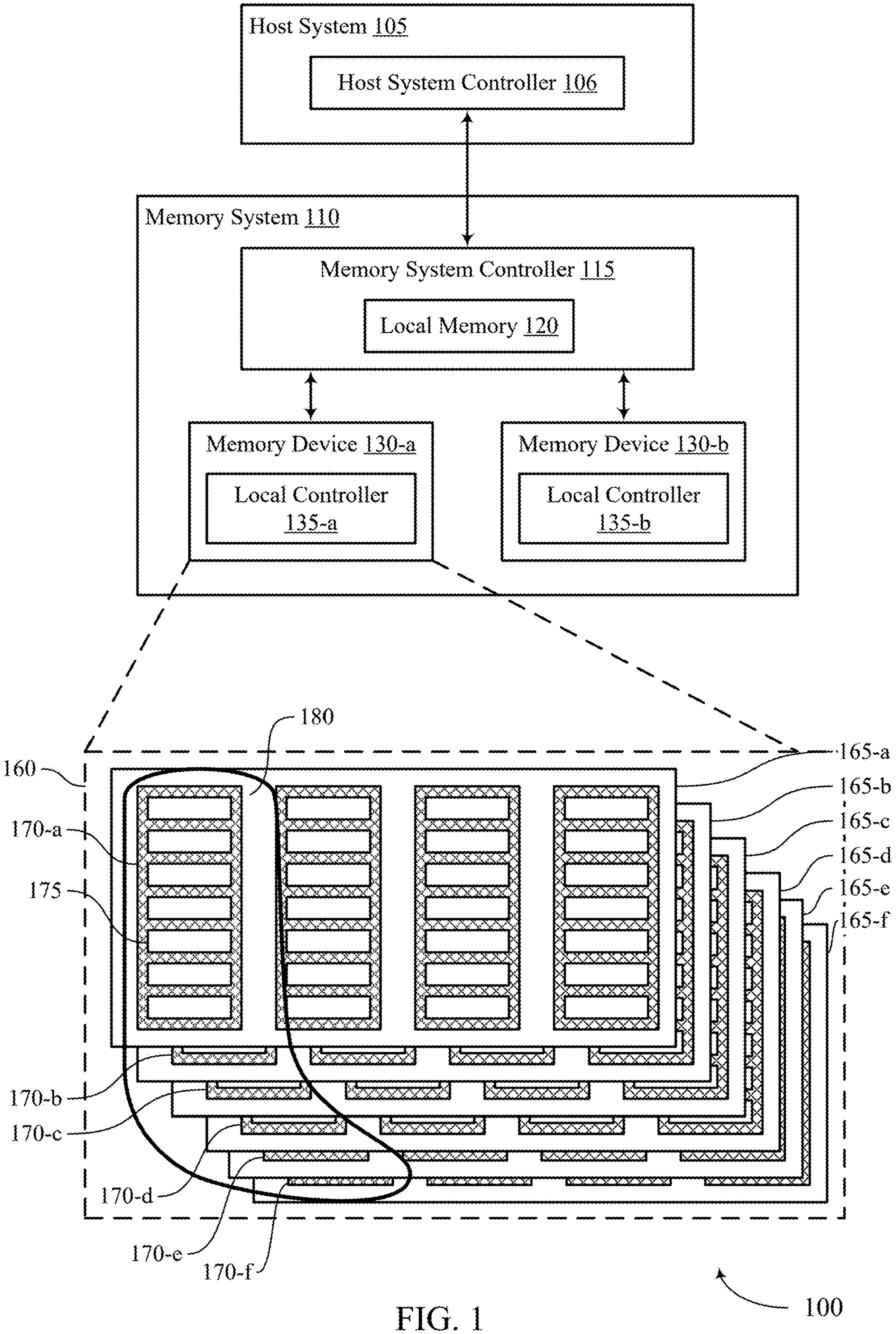
FIG. 1 shows an example of a system that supports multi-plane pre-read to improve sequential read performance in accordance with examples as disclosed herein.

In some examples, a memory system may support sequential access operations. A memory system may include multiple memory dies, and data may be stored sequentially at a set of regions across the multiple memory dies. Sequential read operations may also be supported by the memory system. For example, in response to a read command from a host device to read first data, a controller may perform read operations at each of the set of memory dies. In some cases, such as for NAND devices, each memory die may include a plurality of planes, and each read operation may involve reading multiple planes of a memory die. To support faster read speeds, some memory systems may incorporate larger quantities of planes per memory die. In some cases, however, the larger quantity of planes may cause a misalignment with a size (e.g., a chunk size) associated with the data requested by read commands from the host device. For example, the chunk size for a sequential read may not be a multiple of the quantity of planes per memory die. For a last read operation corresponding to a read command for the first data, a first subset of planes read from a memory die may contain a portion of the first data, which may be output to the host device. However, a second subset of the planes may not include portions of the first data. Where multiple sequential read commands are received by the memory system, multiple read operations on different subsets of planes of the same memory die may result to read the data associated with the different sequential read operations.

In accordance with examples as described herein, a memory system may include a buffer configured to store data read from planes of the memory die not associated with a first sequential read command. For example, a host device may issue a read command for first data stored sequentially at a set of memory dies, and a controller may perform multiple read operations in response to the read command. For a last read operation, data read from a first subset of planes from a memory die may be output to the host device, while data read from a second subset of planes from the memory die may be stored at the buffer. In some examples, the host device may issue another read command for second data, and the memory die may output the data stored at the buffer in response to the read command, without performing another read operation on the memory die. As such, by storing data read from a subset of planes from a memory die at a buffer of the memory system, performance of sequential read operations at a set of memory dies may be increased.

In addition to applicability in memory systems as described herein, techniques for improving sequential read operations by performing multi-plane pre-read operations may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by improving memory access performance and speed, which may decrease processing or latency times, improve response times, and otherwise improve user experience, among other benefits.

Features of the disclosure are illustrated and described in the context of systems, devices, and circuits. Features of the disclosure are further illustrated and described in the context of access diagrams and flowcharts.

FIG. 1 shows an example of a system 100 that supports multi-plane pre-read to improve sequential read performance in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, 170-*d*, 170-*e*, and 170-*f* that are within planes 165-*a*, 165-*b*, 165-*c*, 165-*d*, 165-*c*, and 165-*f*, respectively, and blocks 170-*a*, 170-*b*, 170-*c*, 170-*d*, 170-*c*, and 170-*f* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support plane pre-read for NAND sequential read performance. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some examples, data may be stored sequentially at a set of memory devices 130, and memory system 110 may support sequential read operations. For example, in response to a read command from the host system 105, the memory system 110 (e.g., the memory system controller 115) may perform multi-plane read operations at each of the set of memory devices 130. In some examples, to support faster read speeds, memory devices 130 may incorporate larger quantities of planes 165 per memory die.

In some cases, however, the larger quantity of planes (e.g., moving from four to six planes) may cause a misalignment with a size (e.g., a chunk size) associated with the data (e.g., a size of the data) requested by read commands from the host system 105. For example, the host system 105 may use a sequential read chunk size of 512 kilobytes (kB) or 1024 kB, which may not be a multiple of a size associated with the multi-plane read operations for a memory device 130. As such, for a last read operation corresponding to a read command for the first data, the plane 165-*a* and the plane 165-*b* may be read from the memory device 130-*a* and may contain a portion of the first data, which may be output to the host system 105. As such, if multiple sequential read commands are received by the memory system 110, multiple read operations on different subsets of planes of the same memory device 130 may result to read the data associated with the different sequential read operations.

In accordance with examples as described herein, the memory system 110 may include one or more buffers (e.g., within one or more memory system controllers 115) configured to store data read from planes of the memory device 130 that may not be associated with a current sequential read command. For example, the host system 105 may issue a read command for first data stored sequentially at a set of memory devices 130, and the memory system 110 may perform multiple read operations in response to the read command. For a last read operation, data read from a first subset of planes 165 from a memory device 130 may be output to the host system 105, while data read from a second subset of planes 165 from the memory device 130 may be stored at the buffer. In some examples, the host system 105 may issue another read command for second data, and the memory system 110 may output the data stored at the buffer in response to the read command, without performing another read operation on the memory device 130. In some examples, each memory device 130 may include a buffer configured to store pre-read data from planes 165 of each respective memory device 130. Alternatively, the memory system 110 may include a single buffer configured to store data read from planes 165 of any memory device 130 of the memory system 110. As such, by storing data read from a subset of planes from the memory device 130 at a buffer of the memory system 110, performance of sequential read operations at a set of memory devices 130 may be increased.

Figure 2:
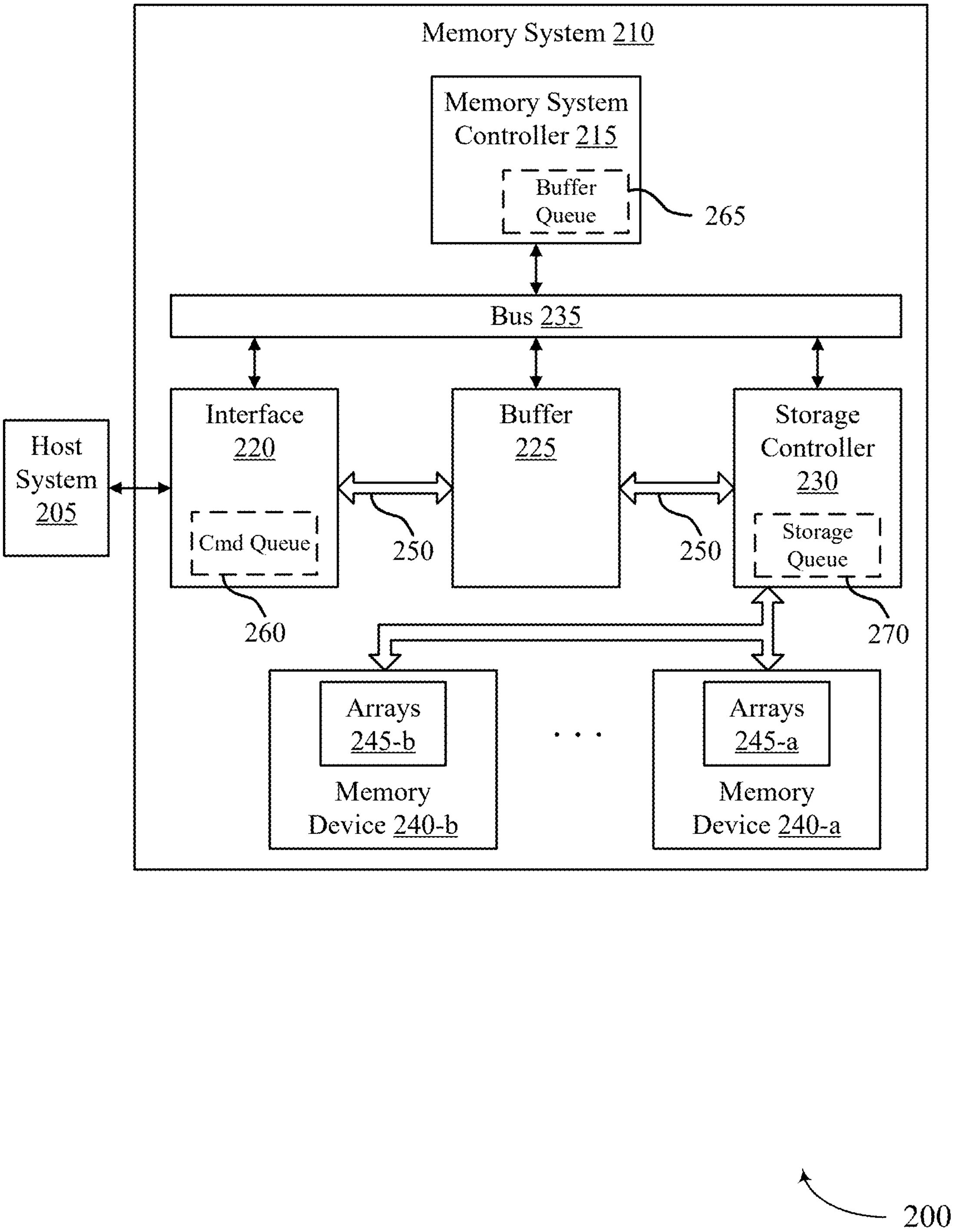
FIG. 2 shows an example of a system that supports multi-plane pre-read to improve sequential read performance in accordance with examples as disclosed herein.

FIG. 2 shows an example of a system 200 that supports multi-plane pre-read to improve sequential read performance in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240, such as the memory device 240-*a* and the memory device 240-*b*, to store data transferred between the memory system 210 and the host system 205 (e.g., in response to receiving access commands from the host system 205) as described with reference to FIG. 1. The memory devices 240 may include one or more memory arrays 245, such as the arrays 245-*a* and the arrays 245-*b*. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples. While the memory system 210 is illustrated containing two memory devices 240, the memory system 210 may include more memory devices 240 or fewer memory devices 240.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

After the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some examples, data may be stored sequentially at the memory devices 240, which may support sequential read operations. For example, in response to a read command from the host system 205, the memory system 210 (e.g., the memory system controller 215) may perform a multi-plane read operation at each of the set of memory devices 240, where each multi-plane read operation may involve reading one or more pages 175 from each plane of a memory device 240. In some examples, to support faster read speeds, memory devices 240 may incorporate larger quantities of planes per memory die. In some cases, however, the larger quantity of planes (e.g., moving from four to six planes) may cause a misalignment with a size (e.g., a chunk size) associated with the data requested by read commands from the host system 205. For example, for a last read operation corresponding to a read command for the first data, a first subset of planes read from the memory device 240-*a* may contain a portion of the first data, which may be output to the host system 205. If multiple sequential read commands are received by the memory system 110, multiple read operations on different subsets of planes of the same memory device 130 may result to read the data associated with the different sequential read operations. As such, the misalignment of the quantity of planes with the size associated with the data requested by read commands may cause a decrease in performance for sequential read operations.

In accordance with examples as described herein, a memory device 240 may include one or more buffers configured to store data read from planes of the memory device 240. For example, the one or more buffers may be (e.g., at least a portion of) the buffer 225. Additionally, or alternatively, the one or more buffers may be a separate buffer (e.g., within a controller of the memory system 210, such as the memory system controller 215), or the one or more buffers may refer to data that may be stored in latches of each respective memory device 240-*b*. The host system 205 may issue a read command for first data stored sequentially at a set of memory devices 240, and the memory system 210 may perform a set of read operations in response to the read command. For a last read operation of the set, a controller may determine that a remaining portion of the first data is stored within a first subset of planes 165 of the memory device 240-*a*. The controller may then perform a multi-plane read operation to read each plane 165 of the memory device 240-*a*, where data read from the first subset of planes 165 of the memory device 240-*a* may be output to the host system 205, while data read from a second subset of planes 165 from the memory device 240-*a* may be stored at a buffer of the one or more buffers. In some examples, the host system 205 may issue another read command for second data, and the memory system 210 may output the data stored at the buffer of the one or more buffers in response to the read command, without performing another read operation on the memory device 240-*a*. As such, by storing data read from a subset of planes from the memory device 240 at a buffer of the memory system 210, performance of sequential read operations at a set of memory devices 240 may be increased.

Figure 3:
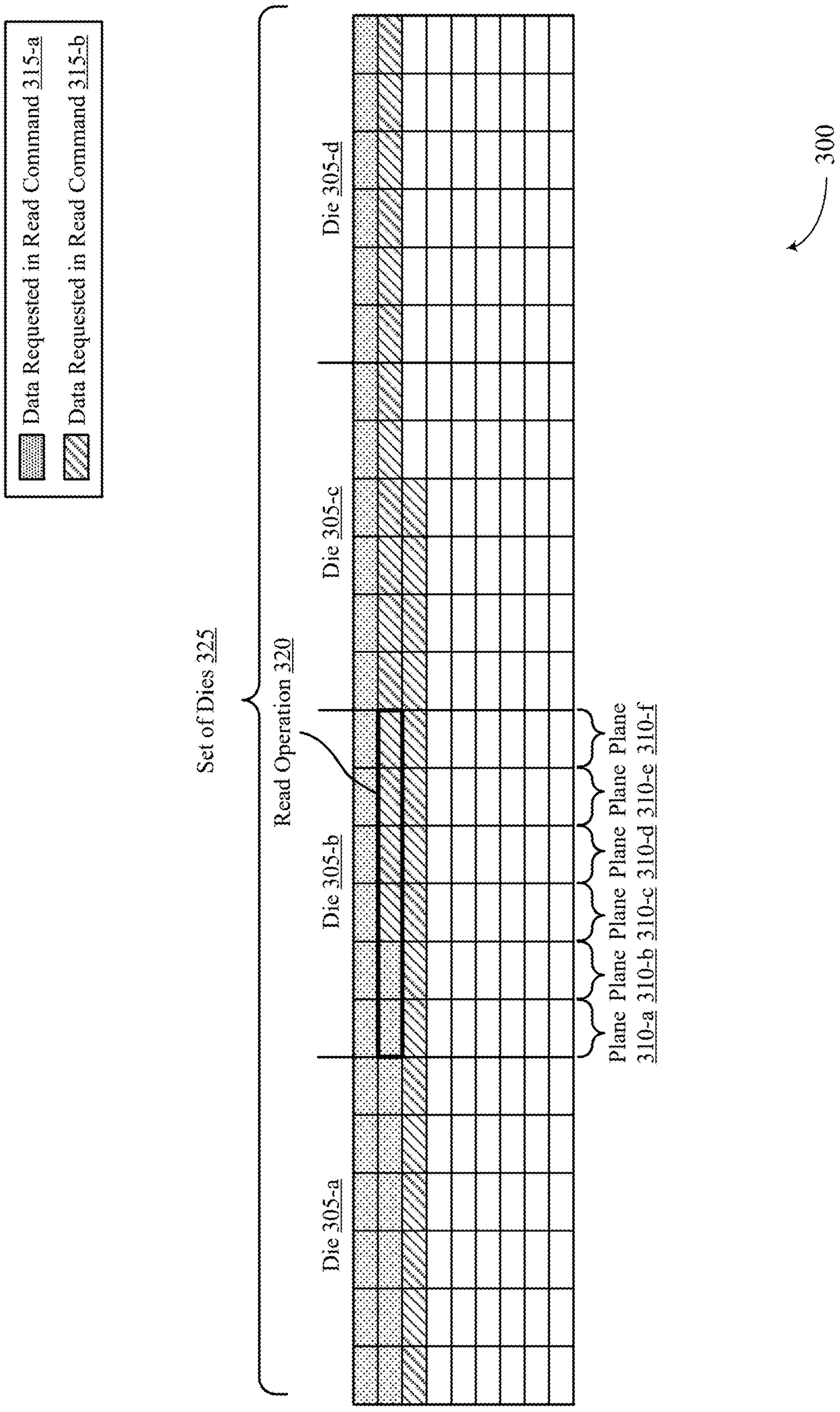
FIG. 3 shows an example of an access diagram that supports multi-plane pre-read to improve sequential read performance in accordance with examples as disclosed herein.

FIG. 3 shows an example of an access diagram 300 that supports plane pre-read to improve sequential read performance in accordance with examples as disclosed herein. In some examples, the access diagram 300 may be implemented in a memory system, such as the memory system 110 or the memory system 210, as described herein with reference to FIGS. 1 and 2.

In some memory systems, data may be stored sequentially at a set of dies 305 (e.g., memory dies, memory devices, as described herein). For example, a memory system may include a set of dies 325 including a die 305-*a*, a die 305-*b*, a die 305-*c*, and a die 305-*d*, and a controller of the memory system may be configured to store data sequentially at the set of dies 325. In some cases, data stored sequentially at the set of dies may have sequential logical address, sequential physical address (e.g., physical page addresses), or both. Each die 305 may include a set of planes 310, as described herein. For example, a die 305-*b* may include a plane 310-*a*, a plane 310-*b*, a plane 310-*c*, a plane 310-*d*, a plane 310-*e*, and a plane 310-*f*.

In some examples, in response to a read command 315 issued by a host device, multiple read operations may be performed on multiple dies 305 of the set of dies 325. In some cases, each read operation may read (e.g., one or more pages from) each plane 310 of a corresponding die 305. For example, a read operation 320 may read data (e.g., a page of data) stored at the plane 310-*a*, the plane 310-*b*, the plane 310-*c*, the plane 310-*d*, the plane 310-*e*, and the plane 310-*f* of the die 305-*b*.

In some cases, however, a quantity of planes (e.g., six planes) of the die 305-*b* may cause a misalignment with a size (e.g., a chunk size) associated with the data requested by read commands 315 from the host system. For example, a read command 315-*a* requesting first data and issued by the host device may use a sequential read size of 512 KB (e.g., or 1024 KB), while a size of data (e.g., page size) stored at each plane may be 16 kB. As such, read operations performed in response to the read command 315-*a* may read 96 KB of data (e.g., 16 kB for six planes 310) from each memory die 305. However, 512 KB is not a multiple of 96 kB. Consequently, for the read operation 320 shown in FIG. 3, which may be a last read operation performed in response to the read command 315-*a*, the data stored at the plane 310-*a* and the plane 310-*b* may correspond to the first data requested by the read command 315-*a* while data stored at the plane 310-*c*, the plane 310-*d*, the plane 310-*e*, and the plane 310-*f* may correspond to second data different form the first data. If the host system issues a read command 315-*b* to read the second data, the read operation 320 on the die 305-*b* may be performed again to read the data stored at the plane 310-*c*, the plane 310-*d*, the plane 310-*e*, and the plane 310-*f*, which may cause a decrease in performance for sequential read operations due to the redundant read operation 320.

In some systems, to avoid performing redundant read operations, data read from some planes (e.g., two planes) of a die 305 may be transferred to volatile memory (e.g., SRAM). If a next read command 315 is issued requesting the data, a command may be issued to transfer remaining data from a latch register (e.g., a NAND latch register) of the die 305 to the volatile memory, and the data may then be output to the host device. However, transferring data from a latch register of the die 305 may incur additional overhead, which may still cause some performance degradation.

In accordance with examples as described herein, the memory system may include one or more buffers configured to store data read from planes of dies 305. For example, the controller of the memory system may include the one or more buffers. In some cases, the one or more buffers may include a respective buffer for each die 305. Additionally, or alternatively, the one or more buffers may include a buffer configured to store data from any die 305. In some cases, each buffer may include relatively fast memory (e.g., volatile memory, such as SRAM or DRAM). In some examples, the data stored at the buffer may be stored at one or more latches (e.g., NAND latches) associated with each die 305 (e.g., rather than at a buffer of the controller).

In some examples, storing data from a read operation 320 in a buffer may be based on (e.g., conditional on) one or more conditions being met. For example, the memory system may store the pre-read data at a buffer if the logical block addresses associated with one or more issued commands (e.g., the read command 315-*a*) are continuous. Additionally, or alternatively, the pre-read data may be stored at the buffer if a page physical address of a current read command 315 (e.g., the read command 315-*a*) is continuous with a page physical address of a previous (e.g., a last issued) read command. Additionally, or alternatively, storing pre-read data at the buffer may be dependent on a last continuous read chunk associated with a read operation not covering (e.g., spanning) each plane 310 of a corresponding die 305.

For example, the host device may issue the read command 315-*a* requesting first data (e.g., with a size of 512 kB) stored sequentially across the die 305-*a*, the die 305-*b*, the die 305-*c*, and the die 305-*d*. In response, read operations may be performed at each die 305 of the set of dies 325 at least once. The memory system (e.g., a controller of the memory system, a processor of the memory system) may determine that a last portion of the first data does not span each plane 310 *f* the die 305-*b*. As such, for a last read operation 320 performed in response to the read command 315-*a*, data read from the plane 310-*a* and the plane 310-*b* may be output to the host system, while data read from the plane 310-*c*, the plane 310-*d*, the plane 310-*e*, and the plane 310-*f* may be stored at a buffer of the memory system (e.g., of the controller, associated with the die 305-*b*). In some examples, outputting the data from the plane 310-*a*, from the plane 310-*b*, or both, may be performed concurrently (e.g., during at least partially overlapping time occasions) as storing the data from the plane 310-*c*, the plane 310-*d*, the plane 310-*e*, or the plane 310-*f* at the buffer.

In some examples, the host system may issue the read command 315-*b* requesting second data. The memory system (e.g., a controller of the memory system, a processor of the memory system) may determine whether the second data is continuous (e.g., continuous with the first data, such as if the logical block addresses are continuous, the page physical addresses are continuous, or both). Additionally, or alternatively, the memory system may determine whether a portion of the second data is stored at the buffer. For example, the buffer may compare physical dresses, logical addresses, or both, of the data stored at the buffer and the data requested by the read command 315-*b* to determine whether the data is stored at the buffer. The memory system may output a portion of the second data from the buffer to the host system, without performing an additional read operation on die 305-*b*.

Read operations may be performed on the set of dies 325 to obtain a remainder of the second data. In some cases, a last read operation performed in response to the read command 315-*b* may not span each plane 310 of the die 305-*c*, and data stored at a subset of planes (e.g., a last two planes 310) of the die 305-*c* may be stored at a buffer of the memory system.

In some examples, the host system may issue another read command 315 associated with additional data stored at the set of dies 325. In some cases, the memory system may determine that no portion of the additional data is stored at the buffer. For instance, the additional data may not be sequential with the data requested by the read command 315-*b*. In some examples, the memory system may clear the buffer based on determining that no portion of the additional data is stored at the buffer.

Accordingly, by storing data read from a subset of planes 310 of a die 305 at a buffer associated with the die 305, the performance of sequential read operations performed at the set of dies 325 may be increased.

Figure 4:
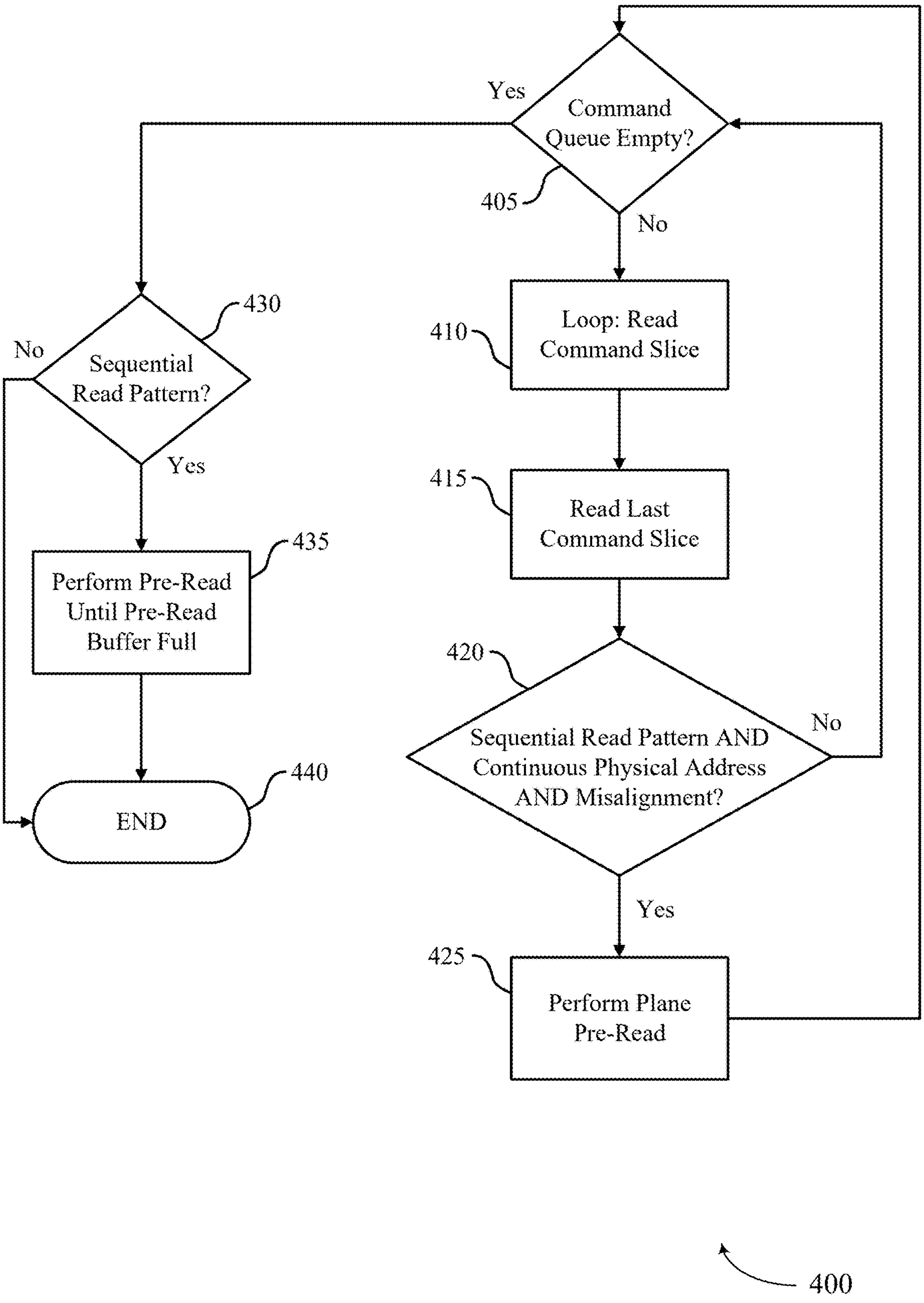
FIG. 4 shows an example of a flowchart that supports multi-plane pre-read to improve sequential read performance in accordance with examples as disclosed herein.

FIG. 4 shows an example of a flowchart 400 that supports multi-plane pre-read to improve sequential read performance in accordance with examples as disclosed herein. In some examples, a process described by the flowchart 400 may be performed in or by a memory system (e.g., a controller), such as the memory system 110 or the memory system 210, as described herein. In some examples, some steps may be omitted from or added to the flowchart 400. Additionally, or alternatively, some steps may be performed in a different order than as shown in FIG. 4.

At 405, the process may involve determining whether a command queue (e.g., a command queue 260) is empty. For example, a memory system may determine whether commands (e.g., read commands) have been received from a host device.

At 410, if the command queue is not empty, the process may involve reading one or more command slices associated with a received read command. For example, the memory system may perform one or more read operations on a set of memory devices to read a portion of data requested by the received read command. As described herein, each read operation may involve a multi-plane read operation on a memory devices of the set of memory devices.

At 415, the process may involve reading a last command slice associated with the received read command. At 420, the process may involve determining whether a read pattern is sequential. For example, the memory system may determine whether read command logical block addresses are continuous for at least two read commands (e.g., at least two read commands issued by the host device, at least two command slices associated with a read command, or both). Additionally, or alternatively, the process may include determining whether a physical address is continuous. For example, the memory system may determine whether a page physical address is continuous for the received read command (e.g., for command slices associated with the received read command, for the last command slice associated with the received read command). Additionally, or alternatively, the process may include determining whether there is a misalignment. For example, the memory system may determine whether the last command slice covers data stored at each plane of a memory device. Additionally, or alternatively, the memory system may determine whether a size associated with a multi-plane read operation for a memory device is a multiple of a read size (e.g., a sequential read chunk size) associated with the received read command.

At 425, if these conditions are met (e.g., if each condition is met, if at least some of these conditions are met), a multi-plane pre-read may be performed, as described herein. For example, a memory system may store data read from a subset of planes of a memory device associated with the last command slice at a buffer associated with the last command slice. After performing the plane-pre read, the memory system may return to 405 and determine whether the command queue is empty.

At 430, if the command queue is empty, the process may involve determining whether a read pattern is sequential. For example, the memory system may determine whether read command logical block addresses are continuous for at least two read commands (e.g., at least two read commands issued by the host device, at least two command slices associated with a read command, or both). Additionally, or alternatively, the memory system may obtain an indication that the read pattern is sequential (e.g., from the host system, from a register).

At 435, if the read pattern is sequential, the process may involve performing pre-read operation until a pre-read buffer is full. The pre-read buffer may be different than the one or more buffers associated with storing plane pre-read data. For example, the pre-read buffer may store a larger amount of data relative to the one or more buffers associated with plane pre-read data. Additionally, or alternatively, the pre-read buffer may be the same as the one or more buffers associated with the plane pre-read data. In some examples, the memory system may perform pre-read operations until the pre-read buffer is full. In some cases, the data stored in the pre-read buffer may be indexed. The memory system (e.g., via a controller) may receive a read command from the host device and may determine that data requested by the read command is stored in the pre-read buffer (e.g., a buffer hit) based on the indexing, and the memory system may output data from the pre-read buffer. For example, if the next command after a sequential read includes logical addresses that correspond with data that stored in the pre-read buffer (e.g., as result of a pre-read operation or from a last multi-plane read of a prior sequential read command), the data stored in the pre-read buffer may begin to be output to the host while additional read commands are performed on the memory devices to obtain remaining data associated with the sequential read command.

At 440, if the read pattern is not sequential, or if the pre-read buffer is full, the process may end. In some examples, the memory system may enter an idle mode (e.g., a sleep mode, a standby mode) until it receives another command from the host system, or the memory system may perform idle operations such as management operations, refresh operations, cleaning operations, or other operations.

Figure 5:
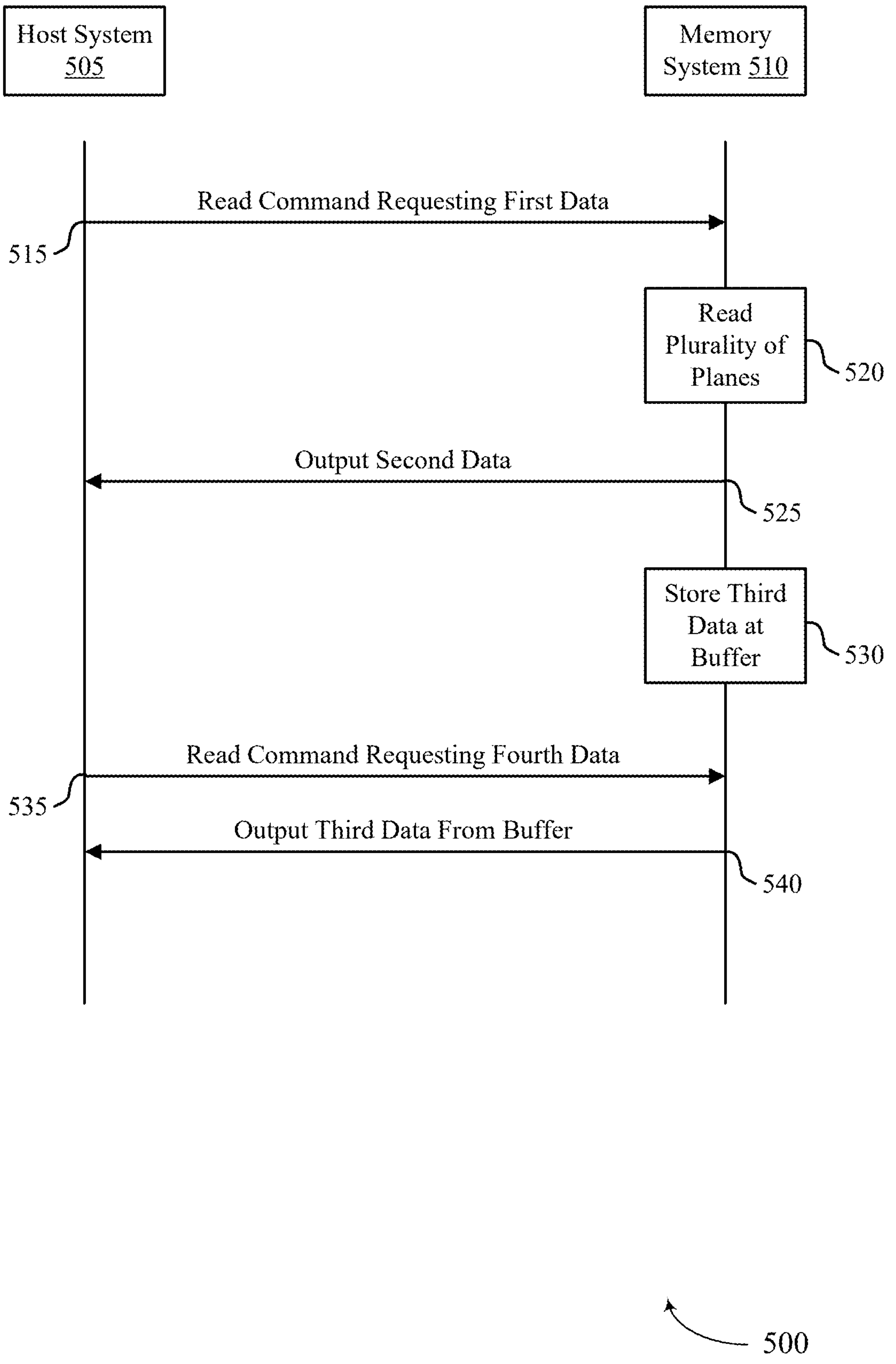
FIG. 5 shows an example of a flowchart that supports multi-plane pre-read to improve sequential read performance in accordance with examples as disclosed herein.

FIG. 5 shows a flowchart illustrating a process flow 500 that supports plane pre-read to improve sequential read performance in accordance with examples as disclosed herein. The process described by the process flow 500 may be implemented with respect to a host system 505 and a memory system 510, which may be examples of corresponding components as described herein with reference to FIGS. 1 through 4. In some examples, some steps may be omitted from or added to the process flow 500. Additionally, or alternatively, some steps may be performed in a different order than shown in the process flow 500.

At 515, the process may include receiving a first read command associated with first data stored sequentially at a set of memory devices (e.g., memory dies). For example, the host system 505 may output the first read command to the memory system 510 (e.g., via one or more controllers).

At 520, the process may include reading a plurality of planes of a first memory device of the set of memory devices as part of a read operation in response to the first read command. For example, the memory system 510 may read the plurality of planes of the first memory device based on identifying that a portion of the first data is stored within a first subset of planes of the plurality of planes.

At 525, the process may include outputting second data corresponding to the portion of the first data stored within the first subset of the plurality of planes as part of the first read operation. For example, the memory system 510 may output the second data based on reading the plurality of planes of the first memory device.

At 530, the process may include storing, at a buffer, third data associated with a second subset of the plurality of planes of the first memory device as part of the first read operation. For example, the memory device may store the third data at a buffer associated with the first memory device based on determining a misalignment between a multiple of a quantity of the plurality of planes and a chunk size associated with the first read command, determining that a read pattern is sequential, or a both.

At 535, the process may include receiving a second read command associated with fourth data stored sequentially at the set of memory devices. For example, the host system 505 may output the second read command to the memory system 510 (e.g., via the one or more controllers).

At 540, the process may include outputting the third data from the buffer based on the fourth data comprising the third data. For example, the memory system 510 may output the third data based on determining that the first data is consecutive with the fourth data (e.g., determining that a physical address associated with the first data is consecutive with a physical address associated with the fourth data, determining that a logical address associated with the first data is consecutive with a logical address associated with the fourth data, or both). Additionally, or alternatively, the memory system 510 may output the third data based on determining that at least a portion of the fourth data is stored at the buffer.

Accordingly, by storing the third data at the buffer based on the first data and the fourth data being sequential, sequential read operations performed with respect to the memory system 510 and the host system 505 may be sped up despite a misalignment between a size of the quantity of the plurality of planes and the chunk size associated with read commands from the host system 505.

Figure 6:
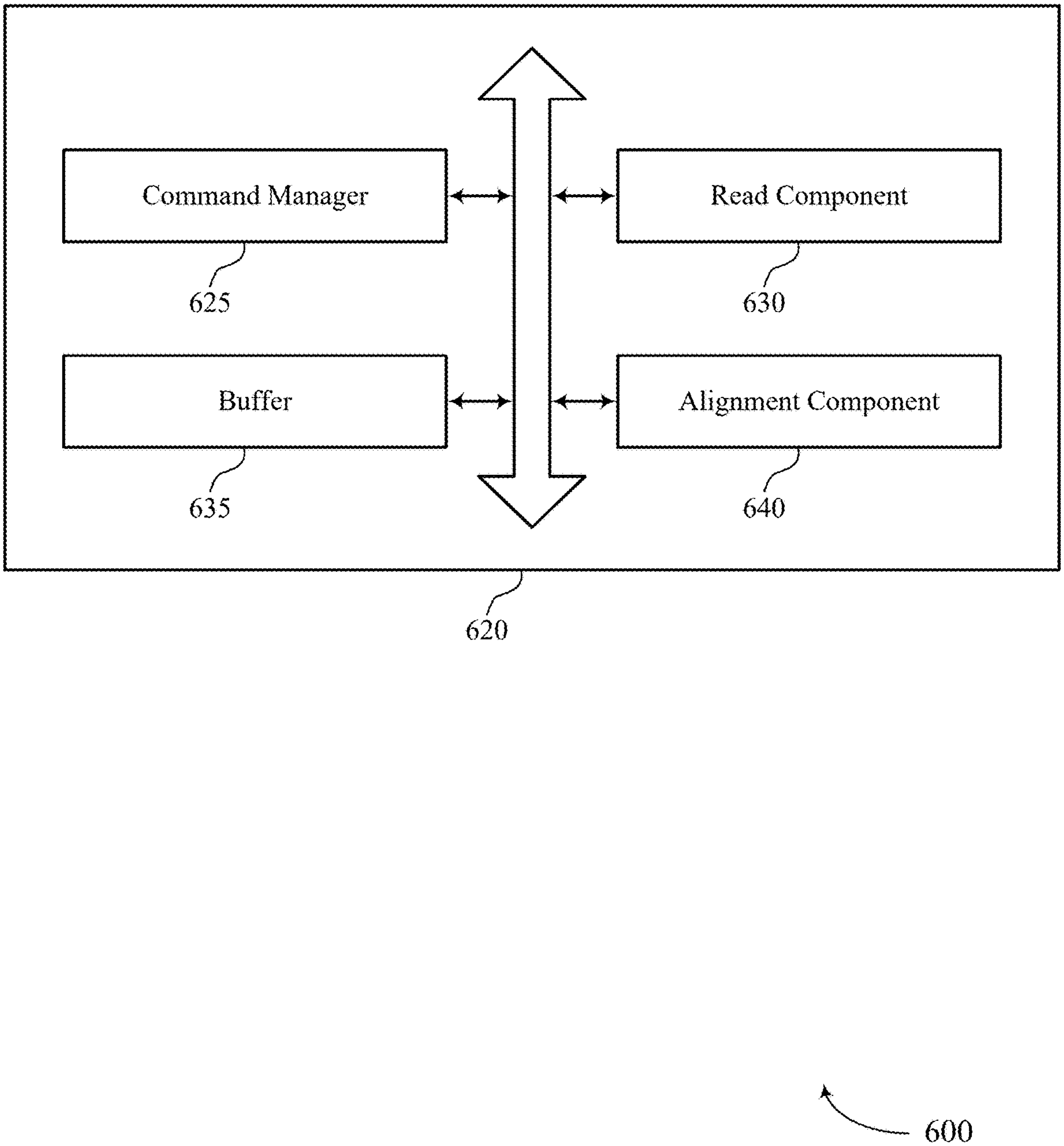
FIG. 6 shows a block diagram of a memory system that supports multi-plane pre-read to improve sequential read performance in accordance with examples as disclosed herein.

FIG. 6 shows a block diagram 600 of a memory system 620 that supports plane pre-read to improve sequential read performance in accordance with examples as disclosed herein. The memory system 620 may be an example of aspects of a memory system as described with reference to FIGS. 1 through 4. The memory system 620, or various components thereof, may be an example of means for performing various aspects of plane pre-read for NAND sequential read performance as described herein. For example, the memory system 620 may include a command manager 625, a read component 630, a buffer 635, an alignment component 640, or any combination thereof. Each of these components, or components of subcomponents thereof (e.g., one or more processors, one or more memories), may communicate, directly or indirectly, with one another (e.g., via one or more buses).

The command manager 625 may be configured as or otherwise support a means for receiving a first read command associated with first data stored sequentially at a set of memory devices. The read component 630 may be configured as or otherwise support a means for performing a first read operation for a first memory device of the set of memory devices in response to the first read command. In some examples, the read component 630 may be configured as or otherwise support a means for reading, as part of the first read operation, a plurality of planes of the first memory device based at least in part on identifying that a portion of the first data is stored within a first subset of the plurality of planes. In some examples, the read component 630 may be configured as or otherwise support a means for outputting, as part of the first read operation, second data corresponding to the portion of the first data stored within the first subset of the plurality of planes. The buffer 635 may be configured as or otherwise support a means for storing, as part of the first read operation, third data associated with a second subset of the plurality of planes. In some examples, the command manager 625 may be configured as or otherwise support a means for receiving a second read command associated with fourth data stored sequentially at the set of memory devices. In some examples, the buffer 635 may be configured as or otherwise support a means for outputting the third data from the buffer based at least in part on the fourth data including the third data.

In some examples, the read component 630 may be configured as or otherwise support a means for determining that the first data is consecutive with the fourth data, where outputting the third data is based at least in part on determining that the first data is consecutive with the fourth data.

In some examples, to support determining that the first data is consecutive with the fourth data, the read component 630 may be configured as or otherwise support a means for determining that a physical address associated with the first data is consecutive with a physical address associated with the fourth data. In some examples, to support determining that the first data is consecutive with the fourth data, the read component 630 may be configured as or otherwise support a means for determining that a logical address associated with the first data is consecutive with a logical address associated with the fourth data.

In some examples, the alignment component 640 may be configured as or otherwise support a means for determining a misalignment between a multiple of a quantity of the plurality of planes and a chunk size associated with the first read command, where storing the third data at the buffer is based at least in part on determining the misalignment.

In some examples, the buffer 635 may be configured as or otherwise support a means for determining that at least a portion of the fourth data is stored at the buffer, where outputting the third data is based at least in part on the determining.

In some examples, to support first read operation, the read component 630 may be configured as or otherwise support a means for reading, prior to reading the plurality of planes of the first memory device, a second plurality of planes of a second memory device of the set of memory devices. In some examples, to support first read operation, the read component 630 may be configured as or otherwise support a means for outputting fifth data corresponding to a second portion of the first data stored within the second plurality of planes. In some examples, the second data is outputted during a first time occasion, the third data is stored at the buffer during a second time occasion, and the first time occasion at least partially overlaps with the second time occasion.

In some examples, the command manager 625 may be configured as or otherwise support a means for receiving a third read command associated with sixth data stored at the set of memory devices. In some examples, the buffer 635 may be configured as or otherwise support a means for clearing the buffer based at least in part on determining that no portion of the sixth data is stored at the buffer.

In some examples, the described functionality of the memory system 620, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 620, or various components thereof, may be implemented at least in part by instructions (e.g., stored in memory, non-transitory computer-readable medium) executable by such at least one processor.

Figure 7:
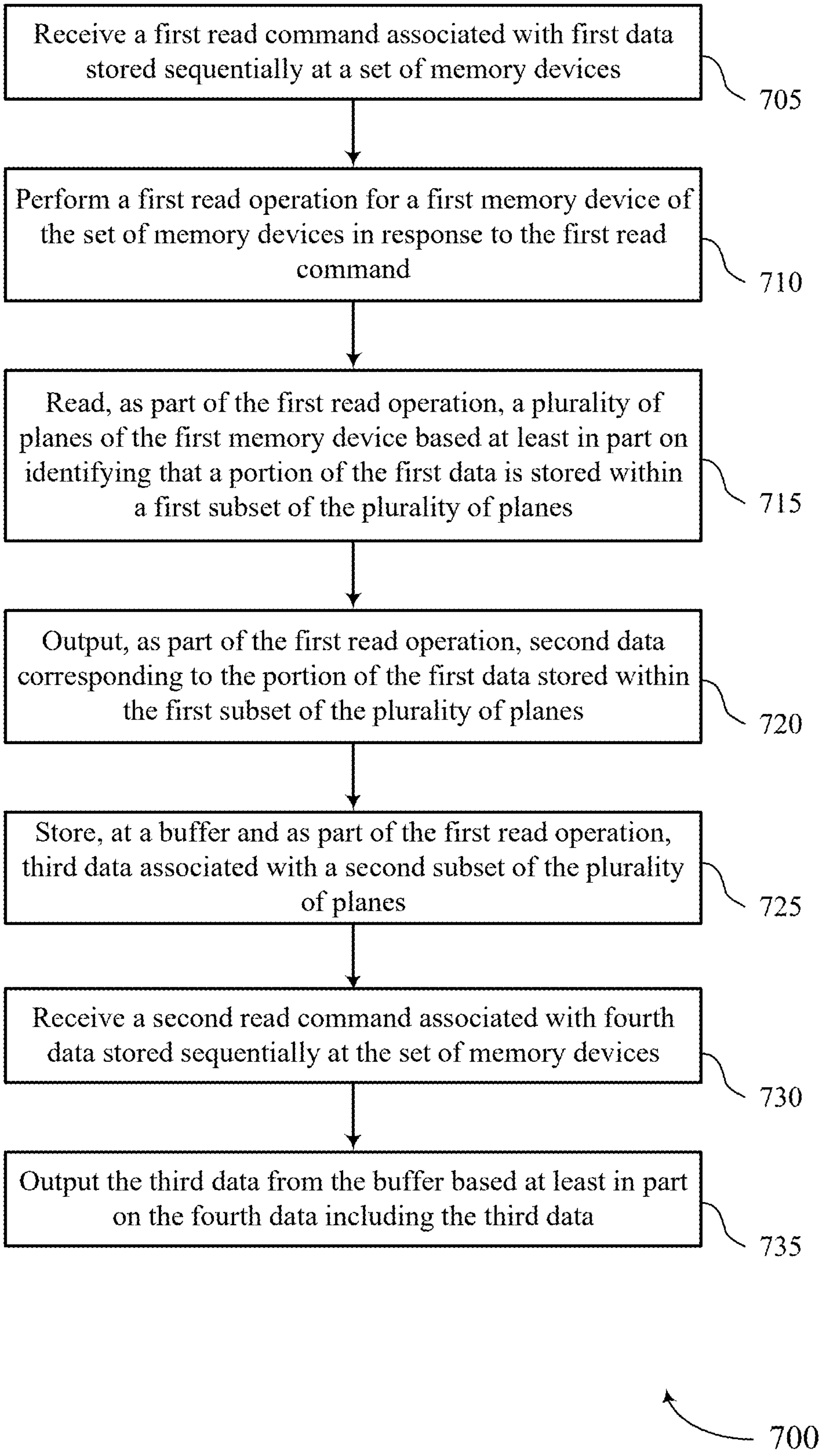
FIG. 7 shows a flowchart illustrating a method or methods that support multi-plane pre-read to improve sequential read performance in accordance with examples as disclosed herein.

FIG. 7 shows a flowchart illustrating a process 700 that supports plane pre-read to improve sequential read performance in accordance with examples as disclosed herein. The operations of process 700 may be implemented by a memory system or its components as described herein. For example, the operations of process 700 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 705, the process may include receiving a first read command associated with first data stored sequentially at a set of memory devices. In some examples, aspects of the operations of 705 may be performed by a command manager 625 as described with reference to FIG. 6.

At 710, the process may include performing a first read operation for a first memory device of the set of memory devices in response to the first read command. In some examples, aspects of the operations of 710 may be performed by a read component 630 as described with reference to FIG. 6.

At 715, the process may include reading, as part of the first read operation, a plurality of planes of the first memory device based at least in part on identifying that a portion of the first data is stored within a first subset of the plurality of planes. In some examples, aspects of the operations of 715 may be performed by a read component 630 as described with reference to FIG. 6.

At 720, the process may include outputting, as part of the first read operation, second data corresponding to the portion of the first data stored within the first subset of the plurality of planes. In some examples, aspects of the operations of 720 may be performed by a read component 630 as described with reference to FIG. 6.

At 725, the process may include storing, at a buffer and as part of the first read operation, third data associated with a second subset of the plurality of planes. In some examples, aspects of the operations of 725 may be performed by a buffer 635 as described with reference to FIG. 6.

At 730, the process may include receiving a second read command associated with fourth data stored sequentially at the set of memory devices. In some examples, aspects of the operations of 730 may be performed by a command manager 625 as described with reference to FIG. 6.

At 735, the process may include outputting the third data from the buffer based at least in part on the fourth data including the third data. In some examples, aspects of the operations of 735 may be performed by a buffer 635 as described with reference to FIG. 6.

In some examples, an apparatus as described herein may perform a method or process, such as the process 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a first read command associated with first data stored sequentially at a set of memory devices; performing a first read operation for a first memory device of the set of memory devices in response to the first read command, the first read operation including: reading a plurality of planes of the first memory device based at least in part on identifying that a portion of the first data is stored within a first subset of the plurality of planes; outputting second data corresponding to the portion of the first data stored within the first subset of the plurality of planes; storing, at a buffer, third data associated with a second subset of the plurality of planes; receiving a second read command associated with fourth data stored sequentially at the set of memory devices; and outputting the third data from the buffer based at least in part on the fourth data including the third data.

Aspect 2: The method, apparatus, or non-transitory computer-readable medium of aspect 1, further including operations, features, circuitry, logic, means, or instructions, or any combination thereof for determining that the first data is consecutive with the fourth data, where outputting the third data is based at least in part on determining that the first data is consecutive with the fourth data.

Aspect 3: The method, apparatus, or non-transitory computer-readable medium of aspect 2, where determining that the first data is consecutive with the fourth data includes operations, features, circuitry, logic, means, or instructions, or any combination thereof for determining that a physical address associated with the first data is consecutive with a physical address associated with the fourth data and determining that a logical address associated with the first data is consecutive with a logical address associated with the fourth data.

Aspect 4: The method, apparatus, or non-transitory computer-readable medium of any of aspects 1 through 3, further including operations, features, circuitry, logic, means, or instructions, or any combination thereof for determining a misalignment between a multiple of a quantity of the plurality of planes and a chunk size associated with the first read command, where storing the third data at the buffer is based at least in part on determining the misalignment.

Aspect 5: The method, apparatus, or non-transitory computer-readable medium of any of aspects 1 through 4, further including operations, features, circuitry, logic, means, or instructions, or any combination thereof for determining that at least a portion of the fourth data is stored at the buffer, where outputting the third data is based at least in part on the determining.

Aspect 6: The method, apparatus, or non-transitory computer-readable medium of any of aspects 1 through 5, where the first read operation further includes operations, features, circuitry, logic, means, or instructions, or any combination thereof for reading, prior to reading the plurality of planes of the first memory device, a second plurality of planes of a second memory device of the set of memory devices and outputting fifth data corresponding to a second portion of the first data stored within the second plurality of planes.

Aspect 7: The method, apparatus, or non-transitory computer-readable medium of any of aspects 1 through 6, where the second data is outputted during a first time occasion, the third data is stored at the buffer during a second time occasion, and the first time occasion at least partially overlaps with the second time occasion.

Aspect 8: The method, apparatus, or non-transitory computer-readable medium of any of aspects 1 through 7, further including operations, features, circuitry, logic, means, or instructions, or any combination thereof for receiving a third read command associated with sixth data stored at the set of memory devices and clearing the buffer based at least in part on determining that no portion of the sixth data is stored at the buffer.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 9: A memory system, including: a set of memory devices, each memory device of the set of memory devices including a plurality of planes; a controller configured to: receive, from a host device, a first read command associated with first data stored sequentially at the set of memory devices; read, in response to the first read command, a plurality of planes of a first memory device of the set of memory devices based at least in part on identifying that a portion of the first data is stored within a first subset of the plurality of planes; and output, to the host device, second data corresponding to the portion of the first data stored within the first subset of the plurality of planes of the first memory device; and a buffer configured to: store, in response to the first read command, third data associated with a second subset of the plurality of planes of the first memory device; and output, in response to a second read command associated with fourth data stored at the set of memory devices, the third data based at least in part on the fourth data including the third data.

Aspect 10: The memory system of aspect 9, where the controller is further configured to: determine that the first data is consecutive with the fourth data, where the controller is configured to cause the buffer to output the third data is based at least in part on determining that the first data is consecutive with the fourth data.

Aspect 11: The memory system of aspect 10, where, to determine that the first data is consecutive with the fourth data, the controller is further configured to: determine that a physical address associated with the first data is consecutive with a physical address associated with the fourth data; and determine that a logical address associated with the first data is consecutive with a logical address associated with the fourth data.

Aspect 12: The memory system of any of aspects 9 through 11, where the controller is further configured to: determine that a quantity of the plurality of planes is associated with a misalignment with respect to a chunk size of the first memory device, where the controller is configured to cause the buffer to store the third data based at least in part on determining that the quantity of the plurality of planes is associated with the misalignment.

Aspect 13: The memory system of any of aspects 9 through 12, where the controller is further configured to: determine that at least a portion of the fourth data is stored at the buffer, where the controller is configured to cause the buffer to output the third data based at least in part on the determining.

Aspect 14: The memory system of any of aspects 9 through 13, where the controller is further configured to: read, prior to reading the plurality of planes of the first memory device, a second plurality of planes of a second memory device of the set of memory devices; and output fifth data corresponding to a second portion of the first data stored within the second plurality of planes.

Aspect 15: The memory system of any of aspects 9 through 14, where the second data is outputted during a first time occasion, the third data is stored at the buffer during a second time occasion, and the first time occasion and the second time occasion at least partially overlap.

Aspect 16: The memory system of any of aspects 9 through 15, further including: a set of buffers including the buffer, where each buffer of the set of buffers corresponds to a respective memory device of the set of memory devices.

Aspect 17: The memory system of any of aspects 9 through 16, where the controller is further configured to: receive a third read command associated with sixth data stored sequentially at the set of memory devices; and clear the buffer based at least in part on determining that no portion of the sixth data is stored at the buffer.

An apparatus is described. The following provides an overview of aspects of the apparatus as described herein:

Aspect 18: An apparatus, including: one or more memory devices; and processing circuitry coupled with the one or more memory devices and configured to: receive a first read command associated with first data stored at the one or more memory devices; perform a first read operation for a first memory device of the one or more memory devices in response to the first read command, the first read operation including: read a plurality of planes of the first memory device based at least in part on identifying that a portion of the first data is stored within a first subset of the plurality of planes; output second data corresponding to the portion of the first data stored within the first subset of the plurality of planes; and store, at a buffer, third data associated with a second subset of the plurality of planes; receive a second read command associated with fourth data stored at the one or more memory devices; and output the third data from the buffer based at least in part on the fourth data including the third data.

Aspect 19: The apparatus of aspect 18, where the processing circuitry is further configured to: determine that the first data is consecutive with the fourth data, where outputting the third data is based at least in part on determining that the first data is consecutive with the fourth data.

Aspect 20: The apparatus of aspect 19, where, to determine that the first data is consecutive with the fourth data, the processing circuitry is further configured to: determine that a physical address associated with the first data is consecutive with a physical address associated with the fourth data; and determine that a logical address associated with the first data is consecutive with a logical address associated with the fourth data.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, and/or materials. In some examples, one layer or level may be composed of two or more sublayers or sublevels.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

receiving a first read command associated with first data stored sequentially at a set of memory devices;

performing a first read operation for a first memory device of the set of memory devices in response to the first read command, the first read operation comprising:

reading a plurality of planes of the first memory device based at least in part on identifying that a portion of the first data is stored within a first subset of the plurality of planes;

outputting second data corresponding to the portion of the first data stored within the first subset of the plurality of planes; and storing, at a buffer, third data associated with a second subset of the plurality of planes;

receiving a second read command associated with fourth data stored sequentially at the set of memory devices; and outputting the third data from the buffer based at least in part on the fourth data comprising the third data.

2. The method of claim 1, further comprising:

determining that the first data is consecutive with the fourth data, wherein outputting the third data is based at least in part on determining that the first data is consecutive with the fourth data.

3. The method of claim 2, wherein determining that the first data is consecutive with the fourth data comprises:

determining that a physical address associated with the first data is consecutive with a physical address associated with the fourth data; and determining that a logical address associated with the first data is consecutive with a logical address associated with the fourth data.

4. The method of claim 1, further comprising:

determining a misalignment between a multiple of a quantity of the plurality of planes and a chunk size associated with the first read command, wherein storing the third data at the buffer is based at least in part on determining the misalignment.

5. The method of claim 1, further comprising:

determining that at least a portion of the fourth data is stored at the buffer, wherein outputting the third data is based at least in part on the determining.

6. The method of claim 1, wherein the first read operation further comprises:

reading, prior to reading the plurality of planes of the first memory device, a second plurality of planes of a second memory device of the set of memory devices; and outputting fifth data corresponding to a second portion of the first data stored within the second plurality of planes.

7. The method of claim 1, wherein the second data is outputted during a first time occasion, the third data is stored at the buffer during a second time occasion, and the first time occasion at least partially overlaps with the second time occasion.

8. The method of claim 1, further comprising:

receiving a third read command associated with sixth data stored at the set of memory devices; and clearing the buffer based at least in part on determining that no portion of the sixth data is stored at the buffer.

9. A memory system, comprising:

a set of memory devices, each memory device of the set of memory devices comprising a plurality of planes;

a controller configured to:

receive, from a host device, a first read command associated with first data stored sequentially at the set of memory devices;

read, in response to the first read command, a plurality of planes of a first memory device of the set of memory devices based at least in part on identifying that a portion of the first data is stored within a first subset of the plurality of planes; and output, to the host device, second data corresponding to the portion of the first data stored within the first subset of the plurality of planes of the first memory device; and a buffer configured to:

store, in response to the first read command, third data associated with a second subset of the plurality of planes of the first memory device; and output, in response to a second read command associated with fourth data stored at the set of memory devices, the third data based at least in part on the fourth data comprising the third data.

10. The memory system of claim 9, wherein the controller is further configured to:

determine that the first data is consecutive with the fourth data, wherein the controller is configured to cause the buffer to output the third data based at least in part on determining that the first data is consecutive with the fourth data.

11. The memory system of claim 10, wherein, to determine that the first data is consecutive with the fourth data, the controller is further configured to:

determine that a physical address associated with the first data is consecutive with a physical address associated with the fourth data; and determine that a logical address associated with the first data is consecutive with a logical address associated with the fourth data.

12. The memory system of claim 9, wherein the controller is further configured to:

determine that a quantity of the plurality of planes is associated with a misalignment with respect to a chunk size of the first memory device, wherein the controller is configured to cause the buffer to store the third data based at least in part on determining that the quantity of the plurality of planes is associated with the misalignment.

13. The memory system of claim 9, wherein the controller is further configured to:

determine that at least a portion of the fourth data is stored at the buffer, wherein the controller is configured to cause the buffer to output the third data based at least in part on the determining.

14. The memory system of claim 9, wherein the controller is further configured to:

read, prior to reading the plurality of planes of the first memory device, a second plurality of planes of a second memory device of the set of memory devices; and output fifth data corresponding to a second portion of the first data stored within the second plurality of planes.

15. The memory system of claim 9, wherein the second data is outputted during a first time occasion, the third data is stored at the buffer during a second time occasion, and the first time occasion and the second time occasion at least partially overlap.

16. The memory system of claim 9, further comprising:

a set of buffers including the buffer, wherein each buffer of the set of buffers corresponds to a respective memory device of the set of memory devices.

17. The memory system of claim 9, wherein the controller is further configured to:

receive a third read command associated with sixth data stored sequentially at the set of memory devices; and clear the buffer based at least in part on determining that no portion of the sixth data is stored at the buffer.

18. An apparatus, comprising:

one or more memory devices; and processing circuitry coupled with the one or more memory devices and configured to:

receive a first read command associated with first data stored at the one or more memory devices;

perform a first read operation for a first memory device of the one or more memory devices in response to the first read command, the first read operation comprising:

read a plurality of planes of the first memory device based at least in part on identifying that a portion of the first data is stored within a first subset of the plurality of planes;

output second data corresponding to the portion of the first data stored within the first subset of the plurality of planes; and store, at a buffer, third data associated with a second subset of the plurality of planes;

receive a second read command associated with fourth data stored at the one or more memory devices; and output the third data from the buffer based at least in part on the fourth data comprising the third data.

19. The apparatus of claim 18, wherein the processing circuitry is further configured to:

determine that the first data is consecutive with the fourth data, wherein outputting the third data is based at least in part on determining that the first data is consecutive with the fourth data.

20. The apparatus of claim 19, wherein, to determine that the first data is consecutive with the fourth data, the processing circuitry is further configured to:

determine that a physical address associated with the first data is consecutive with a physical address associated with the fourth data; and determine that a logical address associated with the first data is consecutive with a logical address associated with the fourth data.

* * * * *